US008948267B1

(12) United States Patent
Khan et al.

(10) Patent No.: US 8,948,267 B1
(45) Date of Patent: Feb. 3, 2015

(54) SYSTEM AND METHOD OF VIDEO CODING USING ADAPTIVE MACROBLOCK PROCESSING

(75) Inventors: Moinul H. Khan, San Diego, CA (US); Jim Zhou, Westborough, MA (US); Jia Bao, Shanghai (CN); Chun Zhu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 1588 days.

(21) Appl. No.: 12/276,060

(22) Filed: Nov. 21, 2008

Related U.S. Application Data

(60) Provisional application No. 60/989,691, filed on Nov. 21, 2007.

(51) Int. Cl.
- *H04N 7/12* (2006.01)
- *H04N 11/02* (2006.01)
- *H04N 11/04* (2006.01)

(52) U.S. Cl.
USPC .................................................. 375/240.24

(58) Field of Classification Search
CPC .. H04N 7/26244; H04N 7/26313; H04N 7/50
USPC ................ 375/240, 240.03, 240.24; 382/251; 712/13
See application file for complete search history.

(56) References Cited

U.S. PATENT DOCUMENTS

| | | | | |
|---|---|---|---|---|
| 2006/0002466 | A1* | 1/2006 | Park | 375/240.03 |
| 2006/0020769 | A1* | 1/2006 | Herrell et al. | 712/13 |
| 2007/0201559 | A1* | 8/2007 | He | 375/240.24 |
| 2008/0056347 | A1* | 3/2008 | Chiu et al. | 375/240 |
| 2009/0016631 | A1* | 1/2009 | Naito et al. | 382/251 |
| 2009/0052542 | A1* | 2/2009 | Romanovskiy et al. | 375/240.24 |
| 2009/0080532 | A1* | 3/2009 | Marpe et al. | 375/240.24 |

OTHER PUBLICATIONS

"H.264/MPEG-4 AVC", Wikipedia, http://en.wikipedia,org/wiki/H.264/MPEG-4_AVC, Oct. 23, 2008.
Tung-Chien Chen et al., "Hardware Architecture Design of an H.264/AVC Video Codec", IEEE, 2006.
Thomas Wiegand et al., "Overview of the H.264/AVC Video Coding Standard", IEEE Transactions on Circuits and Systems for Video Technology, vol. 13, No. 7, Jul. 2003.
"MPEG-2", Wikipedia, http://en.wikipedia,org/wiki/MPEG-2, Oct. 22, 2008.

* cited by examiner

*Primary Examiner* — Jessica M Prince
*Assistant Examiner* — Richard Carter

(57) ABSTRACT

An embodiment of the present invention includes a multi-core processor that processes video data. The control core controls a first processing core to process a first set of data blocks of an image frame according to a stairstep pattern. The control core detects, while the first processing core is processing the first set, that a triggering data block has been processed in the first set. The control core controls, while the first processing core is processing the first set, a second processing core to process a second set of data blocks using information from the triggering data block. By processing data blocks in the stairstep pattern, cache hit rate is improved, resulting in improved video decoder performance.

20 Claims, 6 Drawing Sheets

```
/* VLD and re-sorting of macro block information into stair pattern is done
   before this loop */
for(i=0; i< nTileSizeinMB; i++){
    DoMotionCompensation(i);
}
```

FIG. 8A

```
/* VLD and re-sorting of macro block information into raster pattern is done
   before this loop */
int nMBXIndex = nStartMBXIndex
/* nSLInMB: SL in unit of MB; nSHInMB: SH in unit of MB; nSOInMB: SO in unit
   of MB; refer to FIG. 5 for details */
for(j= nStartMBYIndex; j< min(nFrameHeightInMB, nStartMBYIndex+nSHInMB); j++
){
        /* vertical loop for one stair pattern tile */
        for(i= nMBIndex; i< min(nFrameWidthInMB, nMBXIndex+nSLInMB); i++){
                /* horizontal loop for one stair pattern tile */
                DoMotionCompensation(j* nFrameHeightInMB + i);
        }
        nMBXIndex = max(0, nMBXIndex - nSOInMB);
}
```

FIG. 8B

SYSTEM AND METHOD OF VIDEO CODING USING ADAPTIVE MACROBLOCK PROCESSING

CROSS REFERENCE TO RELATED APPLICATIONS

This application claims the benefit of U.S. Provisional Application No. 60/989,691, filed Nov. 21, 2007, the disclosure of which is incorporated herein by reference.

BACKGROUND

The present invention relates to video coding, and in particular, to decoding of video that has been encoded using data dependency information.

In video coding, one way to increase compression is to represent the information in one portion of the image as the differences from other nearby portions of the image. For example, an image frame may be divided into a multi-pixel grid in which each data block in the grid contains an N×M arrangement of pixels. More specifically, in the MPEG-2 (H.262), MPEG-4 and H.264/AVC video coding schemes, the image frame may be divided into a grid of 16×16 pixels; each 16×16 block is referred to as a "macroblock". The data representing a particular macroblock is typically encoded using the information from adjacent macroblocks, as shown in FIG. 1.

FIG. 1 illustrates data dependency between macroblocks in the H.264/AVC case. For the macroblock 100, the four macroblocks 102, 104, 106 and 108 provide data dependency. The macroblock 102 is above and to the right; the macroblock 104 is above; the macroblock 106 is above and to the left; and the macroblock 108 is to the left. The data dependency from the macroblocks 102 and 106 relates to intra-prediction and motion vector prediction. The data dependency from the macroblocks 104 and 108 relates to intra-prediction, motion vector prediction, and deblocking filtering. The image may then be processed in raster order as shown in FIG. 2.

FIG. 2 illustrates processing macroblocks in raster order for an image frame 200. Raster order processing starts in the upper-left macroblock 202 and proceeds along the row toward the upper-right macroblock 204. From the macroblock 204, the processing proceeds to the leftmost macroblock 206 on the next row. The processing continues in a left-to-right, top-to-bottom manner until the final macroblock 208 is processed.

Note that by processing an image frame in raster order as shown in FIG. 2, the data dependencies required for processing the macroblock 100 (see FIG. 1) are obtained. Specifically, when processing the macroblock 100, the macroblock 108 will have been previously processed according to the left-to-right raster order processing, and the macroblocks 102, 104 and 106 will have been previously processed according to the top-to-bottom raster order processing. Further note that to process a particular row, the data from the entire previous row is required to be available for data dependency purposes.

The H.264 standard allows for macroblocks to be transmitted out of order (that is, in an order other than raster order) using techniques referred to as flexible macroblock ordering (FMO) and arbitrary slice ordering (ASO). (A slice refers to a group of macroblocks.) However, even when video is transmitted out of order, the video is re-ordered prior to decoding, and decoding takes place in raster order as described above.

In this manner, video data is decoded in a linear fashion. One way to increase the rate of processing linear data is to increase the speed of the processing hardware.

SUMMARY

Embodiments of the present invention are directed toward increasing the speed of video decoding without necessarily increasing the speed of the processing hardware. Embodiments of the present invention are suitable for environments where increasing the speed of the processing hardware is undesirable, for example, when size constraints, power constraints, memory constraints, etc. are present. Thus, embodiments of the present invention are suitable for mobile environments.

An embodiment of the present invention includes a multi-core processor that processes video data. A control core controls a first processing core to process a first set of data blocks of an image frame according to a stairstep pattern. The control core detects, while the first processing core is processing the first set, that a triggering data block has been processed in the first set. The control core controls, while the first processing core is processing the first set, a second processing core to process a second set of data blocks using information from the triggering data block. By processing data blocks in the stairstep pattern, cache hit rate is improved, resulting in improved video decoder performance.

An embodiment of the present invention includes a method that controls a multi-core processor to operate as described above.

An embodiment of the present invention is a system that includes the multi-core processor as described above, a memory system, and an interconnect fabric. The memory stores the video data. The interconnect fabric connects the multi-core processor and the memory system. The system otherwise operates as described above.

In an embodiment of the present invention, the control core controls the second core to process the second set according to a second stairstep pattern. The second stairstep pattern may be similar to the first stairstep pattern.

In an embodiment of the present invention, the control core controls the second core to process the second set according to a second stairstep pattern. The control core detects, while the second core is processing the second set, that a second triggering data block has been processed in the second set. The control core controls, while the second core is processing the second set, a third core to process a third set of data blocks using information from the second triggering data block.

In an embodiment of the present invention, the control core detects that the second triggering data block has been processed according to a notification from the second core.

In an embodiment of the present invention, the control core controls the second core to process the second set according to a second stairstep pattern. The control core detects, while the second core is processing the second set, that a second triggering data block has been processed in the second set. The control core controls, while the second core is processing the second set and after the first core has processed the first set, the first core to process a third set of data blocks using information from the second triggering data block.

In an embodiment of the present invention, the control core detects that the second triggering data block has been processed according to a first notification from the second core, and the control core detects that the first set has been processed according to a second notification from the first core.

In an embodiment of the present invention, the first stairstep pattern has a stair height, a stair length, and a stair offset. In an embodiment of the present invention, the first stairstep pattern has a stair height of four data blocks, a stair length of four data blocks, and a stair offset of one data block.

In an embodiment of the present invention, the control core adjusts at least one of a stair height, a stair length, and a stair offset of the first stairstep pattern according to an attribute of a video processing environment that includes the system.

In an embodiment of the present invention, the control core dispatches the first set to the first core and dispatches the second set to the second core. Upon receiving a first notification from the first core, the control core dispatches a third set of data blocks to the first core. Upon receiving a second notification from the second core, the control core dispatches a fourth set of data blocks to the second core.

In an embodiment of the present invention, the data blocks correspond to a frame of image data. The frame includes stairstep patterns (each having a stair height, a stair length, and a stair offset) and remainder patterns.

The following detailed description and accompanying drawings provide a better understanding of the nature and advantages of the present invention.

BRIEF DESCRIPTION OF THE DRAWINGS

FIGS. 8A-8B illustrate example pseudocode segments for processing one stairstep structure (e.g., one tile in a stairstep pattern) according to an embodiment of the present invention.

DETAILED DESCRIPTION

Described herein are techniques for video decoding. In the following description, for purposes of explanation, numerous examples and specific details are set forth in order to provide a thorough understanding of the present invention. The present invention as defined by the claims may include some or all of the features in these examples alone or in combination with other features described below, and may further include modifications and equivalents of the features and concepts described herein.

Demand to support increased video resolutions in mobile handset devices has been stressing the capabilities and especially the power requirements of these devices. In order to keep the processing speed (MHz) low, parallel architectures are being developed in academia as well as in industry. Recently the focus on multi-core architecture is growing. There are many multi-core products and architectures, and video encoding and decoding are relevant popular applications for those systems. Being able to effectively parallelize video algorithms adaptively is desirable for scalability, power savings, and performance.

As discussed above, emerging video compression standards impose dependencies between spatial data. Macroblocks cannot always be processed independently in algorithm flows (for example, intra prediction, motion vector prediction, and deblocking filter). This presents a challenge for task partitioning in a parallel video architecture. Typical approaches include allocating fixed algorithms onto different processing engines and processing macroblocks in sequential order due to data dependency constraints. These solutions are simple but can introduce unbalanced workload deployments. Furthermore they are not flexible in response to any system resource changes.

As detailed below, an embodiment of the present invention is directed toward increasing parallelism in the processing of different data blocks. An embodiment of the present invention may achieve higher memory reuse. An embodiment of the present invention adapts the processing order based on the system memory constraints (e.g., the number of processing engines available, the amount of memory available, etc.).

An embodiment of the present invention is directed toward H.264/AVC (advanced video coding) processing. Similar principles may be applied to other data formats in both encoding and decoding processing.

Figure 2:
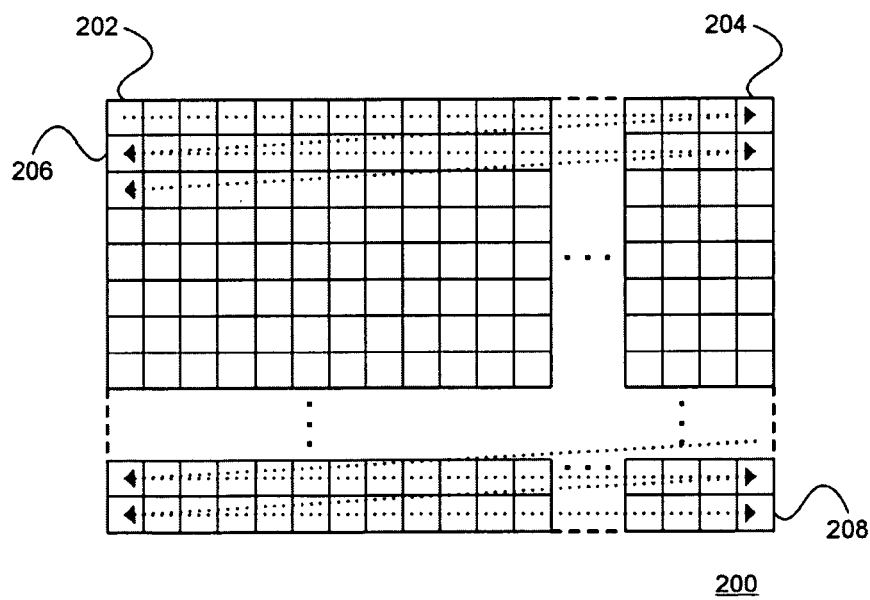
FIG. 2 illustrates processing macroblocks in raster order for an image frame.

As discussed above, the H.264/AVC standard (also referred to as ISO 14496-10) follows conventional hybrid block based video compression. Among the decoding function modules, the motion compensation module is noteworthy in that the motion compensation module uses most-matching blocks from a previous frame to reconstruct a replica of blocks in the current frame. Many existing H.264/AVC decoder implementations implement motion compensation macroblock by macroblock from left-to-right and from top-to-bottom in raster order, as discussed above (see FIG. 2).

As discussed above, raster order decoding has a couple of challenges. One challenge is low data locality. During motion estimation or motion compensation, a statistically high percentage of neighboring macroblocks refer to adjacent (or overlapped) reference macroblocks. However, the caches in typical video systems are not big enough to hold two or more rows of macroblocks. This leads to an increase in the fetch bandwidth of reference macroblocks and an increase in performance degradation. Another challenge is that raster order operation does not render itself efficiently to efficient parallel processing (e.g., multi-core or multi-processor systems).

As discussed above, the H.264 standard allows for macroblock orderings other than raster order. However, these different orderings are geared toward making transmission error resilient, etc. and not toward decoding efficiency. According to an embodiment of the present invention, transmission reordering or reception reordering may be performed in addition to the reordering described below with reference to an embodiment of the present invention.

Figure 3A:
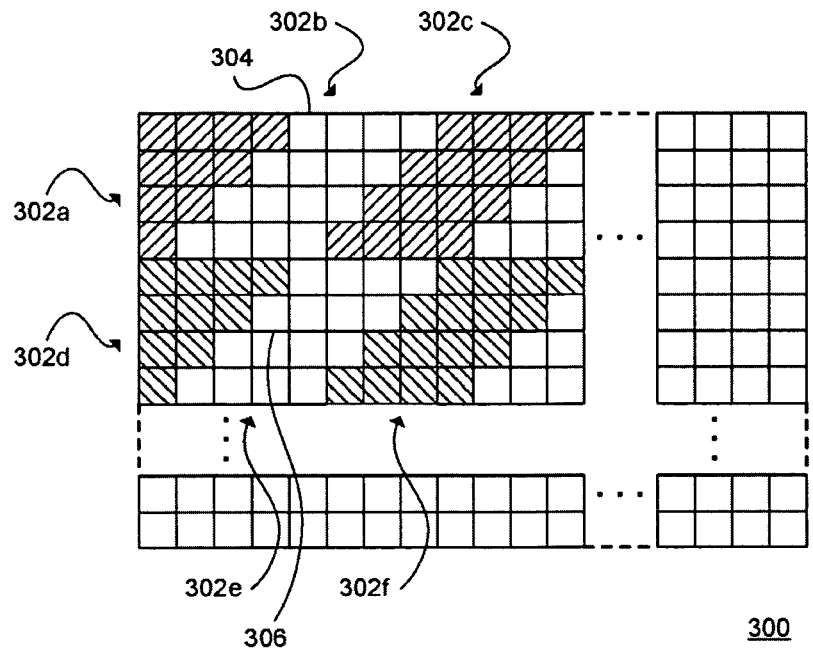
FIGS. 3A-3B illustrate a stairstep pattern of processing data blocks according to an embodiment of the present invention.
Figure 3B:
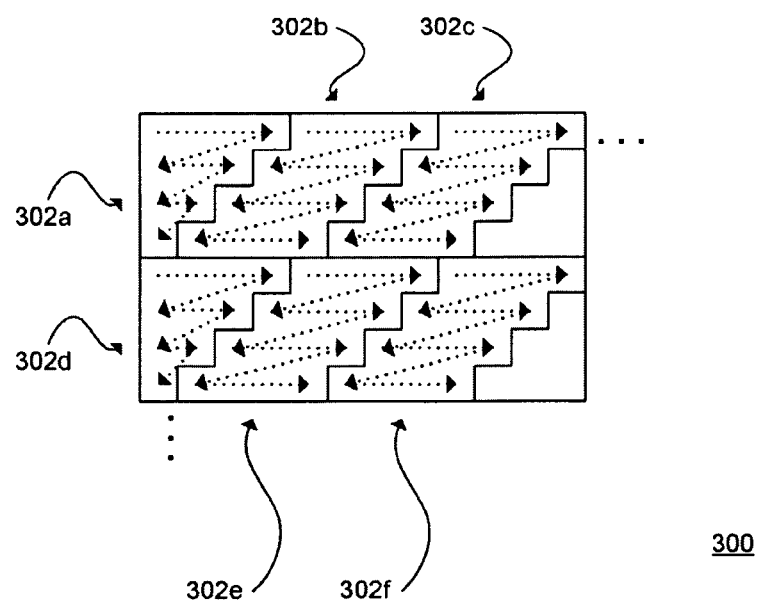

FIGS. 3A-3B illustrate a stairstep pattern of processing data blocks according to an embodiment of the present invention. FIG. 3B removes some of the data block boundaries from FIG. 3A in order to show the processing flow. (For clarity, this description implements aspects of embodiments of the present invention using H.264 terminology, but the principles may also be applied to other standards and related terminology.) In FIG. 3A, the image frame 300 is divided into a number of blocks (for example, macroblocks similar to that of FIG. 2). The macroblocks are grouped into groups 302a, 302b, etc. (collectively "groups 302") that each have a stairstep pattern. The groups 302 may also be referred to as tiles. (The labeled macroblocks 304 and 306 are discussed below with reference to FIG. 6.)

Although the groups 302 are generally discussed as being "stairstep", note that since the image frame 300 is square, some of the groups 302 are not fully stairstep. For example, group 302b is fully stairstep; but group 302a is not, since portions of the group 302a that would otherwise be present are outside of the Image frame 300. Groups such as group 302a may be referred to as remainder groups. However, the processing of the remainder groups is, for purposes of the present invention, identical to the processing of groups that are fully stairstep, so a separate discussion is omitted for brevity.

The stairstep arrangement of the macroblocks in the groups 302 increases the data locality within a particular group during encoding and decoding. In this manner the processing is similar to tile-based processing for graphics. While such a processing order reduces cache misses and allows for parallel processing, it introduces complex dependencies between macroblocks due to inter-block dependencies introduced by the intra-prediction, motion vector prediction, and deblocking filters (see FIG. 1). Dependencies are from four spatial directions: left-above, above, right-above, and left. The right-above direction introduces inter-tile dependency.

According to an embodiment of the present invention, different groups 302 are processed by different processing engines. For example, in a dual-core system, one core processes groups 302a, 302c, 302e, etc., and the other core processes groups 302b, 302d, 302f, etc. In a three-core system, one core processes groups 302a, 302d, etc.; a second core processes groups 302b, 302e, etc.; and a third core processes groups 302c, 302f, etc.

Figure 1:
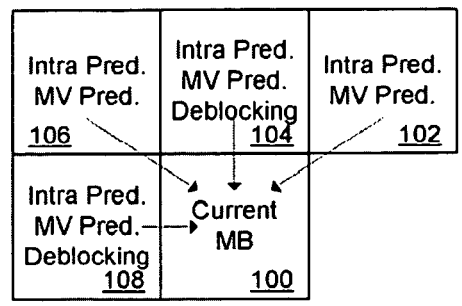
FIG. 1 illustrates data dependency between macroblocks.

Comparing FIG. 1 and FIG. 3A, note that data dependencies between the groups 302 are limited. For example, blocks of the group 302b may depend upon recently processed blocks of the group 302a. The recently processed blocks of 302a are referred to as "triggering blocks" in that when a triggering block has been processed, the adjacent group can then use the information in the triggering block for data dependency processing in the adjacent group.

The stairstep arrangement and processing results in one or more of the following noteworthy features. First, such a processing technique takes advantage of cache locality. The stairstep arrangement and processing significantly enhances the H.264/AVC video decoding motion compensation data locality, hence boosting performance on embedded systems with limited cache size or low memory bus bandwidth. Second, the dependencies between macroblocks are resolved by the inherent structure of the processing tile. Third, the processing is parallelizable between multiple processing engines, yet the interprocessor communication is not overly complex. Synchronization between the processing engines is performed as further detailed below. Fourth, the parallel resources are symmetric (computation MHz, memory required, etc.) and a higher utilization is achieved.

Figure 4:
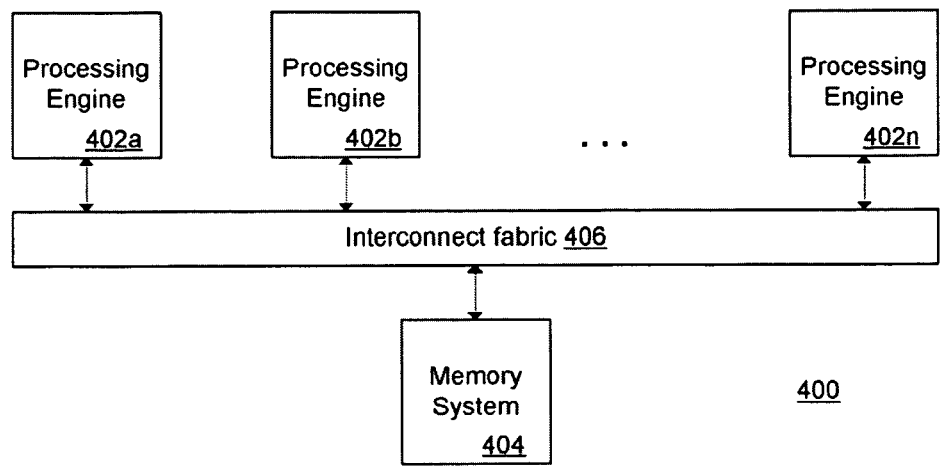
FIG. 4 illustrates an exemplary multi-core processing system according to an embodiment of the present invention.

FIG. 4 illustrates an exemplary multi-core processing system 400 according to an embodiment of the present invention. The multi-core processing system 400 includes two or more processing engines 402 (shown are 402a, 402b, . . . , and 402n), a memory system 404, and an interconnect fabric 406. The memory system 404 may include a cache or SRAM (synchronous random access memory). The interconnect fabric connects the processing engines 402 and the memory system 404.

An embodiment of the present invention may be implemented using a programmable video accelerator. However, other architectures may also be used.

While FIG. 3A illustrates a specific example of a stairstep arrangement, the stairstep arrangement may be generalized as described with reference to FIG. 5. (Specific embodiments described herein make reference to the stairstep of FIG. 3A for ease and clarity of description.)

Figure 5:
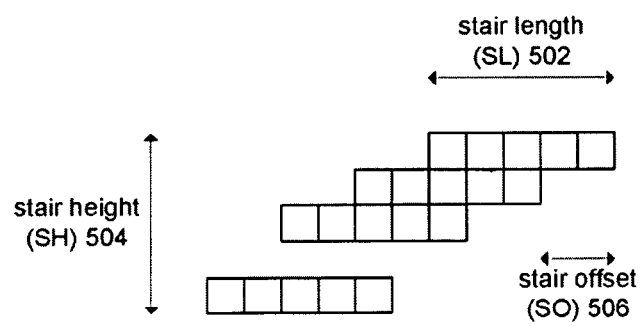
FIG. 5 illustrates how the stairstep arrangement (see FIG. 3A) can be parametrically represented according to an embodiment of the present invention.

FIG. 5 illustrates how the stairstep arrangement (see FIG. 3A) can be parametrically represented according to an embodiment of the present invention. The stairstep 500 has three parameters: stair length (SL) 502, stair height (SH) 504, and stair offset (SO) 506. The stair length 502 is the number of adjacent data blocks in a row. In FIG. 5, the exemplary SL is five. The stair height 504 is the number of rows occupied by the stairstep 500. In FIG. 5, the exemplary SH is four. The stair offset 506 is the horizontal displacement of data blocks between adjacent rows. In FIG. 5, the exemplary SO is two.

Based on the chosen values of SL, SO and SH, the following aspects may be adjusted in an embodiment of the present invention. First is the cache locality. SL and SH towards both higher and lower directions reduce the cache locality. Second is the working buffer size. A higher SH increases the buffer size. For a multi-processor system, the size does not change; however, the shared data increases with higher SH. Third is interprocessor communication (IPC). For higher SO, the IPC can be latency tolerant; for lower SO (e.g., less than 2) the IPC becomes complex in terms of intra prediction dependency, etc. A higher SO also increases the buffer requirements. Fourth is interactive latency. For encoding operations, a higher SH increases latency (decreases responsiveness) of the system.

TABLE 1 summarizes some guidelines that may be used when implementing an embodiment of the present invention according to the attributes of a particular video processing environment. The processing tile parameters can be adapted and chosen based on the system performance and constraints imposed by the application and the processing system.

TABLE 1

| Condition | Choice of Parameters | Notes |
| --- | --- | --- |
| Buffer is constrained; memory bandwidth is high | SH = low (e.g., 1) and SL = wide | High resolution video with higher bus frequency |
| Buffer is big; memory bandwidth is constrained | SH = high and SL = wide | Smaller resolution |
| Responsiveness is desired | SH = low and SL = wide | Video conferencing or broadcast reception |
| IPC is slow | SO = high | Slower bus speed |
| Cache size allocated to video processing is limited | SH and SL may be adjusted | Other applications are running |

According to an embodiment of the present invention, these parameters may be configured at application invocation time. Different adaptation algorithms may adjust these parameters with varying levels of efficiency.

Figure 6:
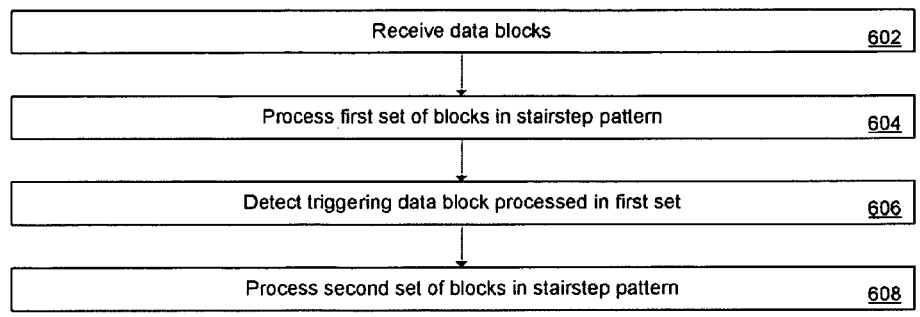
FIG. 6 is a flowchart of a method of processing video data according to an embodiment of the present invention.

FIG. 6 is a flowchart of a method 600 of processing video data according to an embodiment of the present invention. The method 600 may be implemented by a multi-core processor system such as that shown in FIG. 4. The method 600 may be implemented by a computer program (e.g., tangibly stored on a computer-readable medium) that controls a multi-core processor system such as that shown in FIG. 4.

In step 602, a plurality of data blocks are received. The data blocks may be macroblocks that are received in raster order (see FIG. 2).

In step 604, a first set of the plurality of data blocks are processed (decoded) according to a first stairstep pattern. The stairstep pattern may correspond to one of the stairstep structures shown in FIG. 3A. One of the cores of the multi-core processing system may be assigned to process the macroblocks in this stairstep structure.

In step 606, while processing the first set, it is detected that a triggering data block has been processed in the first set. The triggering data block is a data block that involves data dependencies to another stairstep structure. For example, with reference to FIG. 1, the blocks 102, 104, 106 and 108 are potentially triggering data blocks for the block 100. However, due to the stairstep structure (see for example group 302e in FIG. 3A), the triggering data blocks may be slightly different for each block. For example, for the macroblock 304 (see FIG. 3A), the data dependency of FIG. 1 indicates that only the macroblock to the left of 304 is a triggering block. As another example, for the macroblock 306 (see FIG. 3A), the block above 306, the block to the above-left of 306, and the block to the left of 306 are triggering blocks. Note that blocks with data dependencies within the same group 302 (see FIG. 3A) are not considered triggering data blocks.

In step 608, while processing the first set, a second set of the plurality of data blocks are processed using information from the triggering data block. For example, the block 304 (see FIG. 3A) may be processed using information from its triggering block to the left of 304. As another example, the block 306 (see FIG. 3A) may be processed using information from its triggering blocks above 306, to the above-left of 306, and to the left of 306. Note that a particular data block may also be processed using other data dependency information as indicated in FIG. 1.

Given the above general process 600, different parts of an image frame may be processed by different processing cores, each according to a stairstep pattern such as shown in FIG. 3B. Further processing options are as follows.

When there are two processing cores, assume core1 is processing group 302a and core2 is processing group 302b (see FIG. 3B). Core1 must complete processing group 302a before core1 can begin processing group 302c. See below regarding FIG. 7 for further details regarding this processing.

When there are three processing cores, assume core1 is processing group 302a, core2 is processing group 302b, and core3 is processing group 302c (see FIG. 3B). Core1 must complete processing group 302a before core1 can begin processing group 302d, and core2 must complete processing group 302b before core2 can begin processing group 302e. The processing described in FIG. 7 may be extended in a similar manner for three processing cores.

Figure 7:
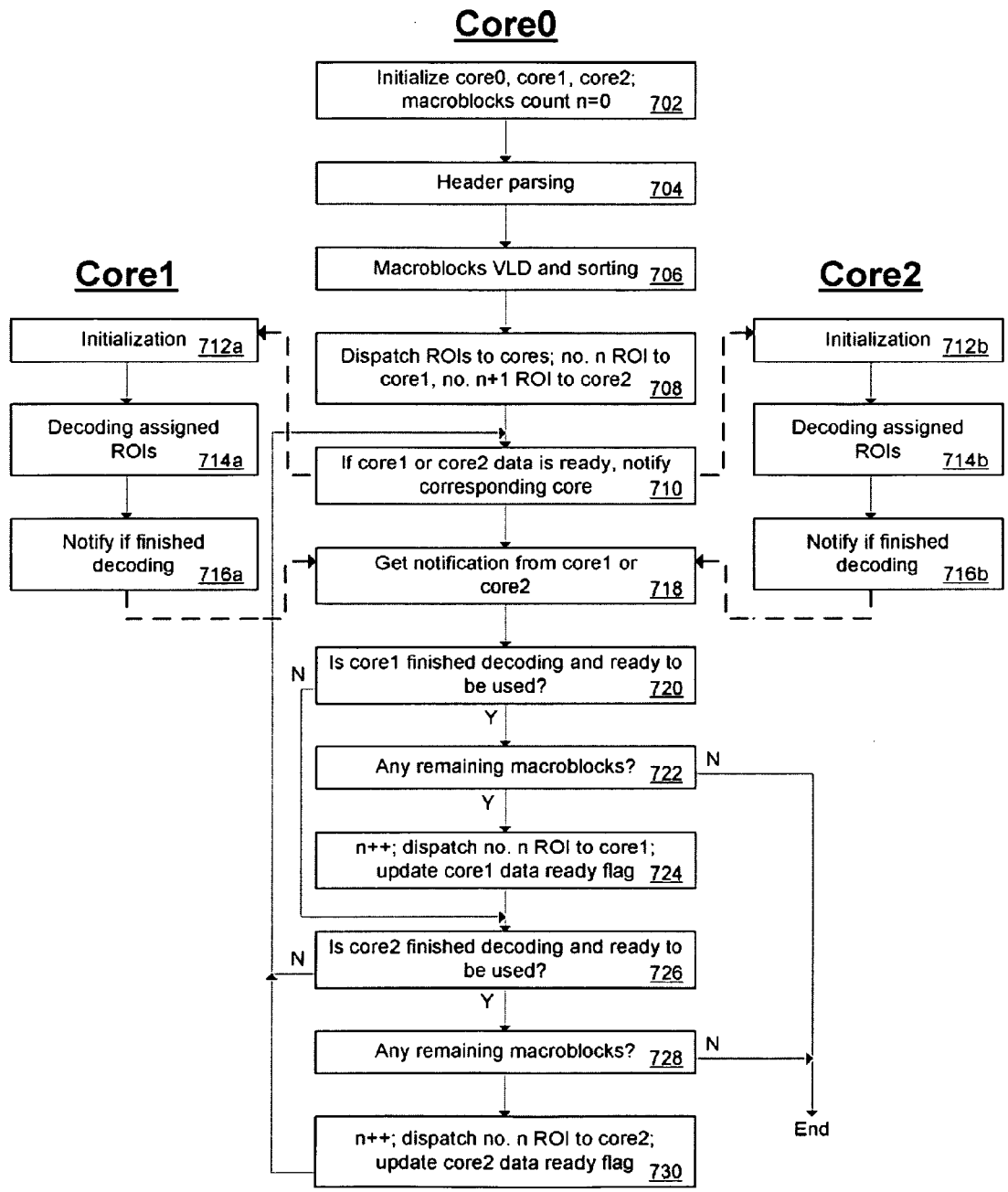
FIG. 7 is a flowchart that illustrates more details of a processing flow in a three-core processing system according to an embodiment of the present invention.

FIG. 7 is a flowchart that illustrates more details of a processing flow 700 in a three-core processing system according to an embodiment of the present invention. A multi-processor system such as the system 400, configured with three processing engines, may be used to implement the processing flow 700. Assume that core0 provides control, and that core1 and core2 perform decoding. Given that H.264/HVC supports out-of-order transmission of macroblocks, a sorting stage may be implemented after VLD (variable length decoding) in core0 for reordering macroblocks before dispatching. Sorting may be involved for conversion from out-of-order receiving to in-order processing even for raster order processing, thus it is not considered as an overhead in this approach. The process 700 may be implemented by a computer program (microcode, etc.) executed by the system 400 that controls (or configures) the system 400 to operate in the manner described below.

In step 702, the cores (core0, core1 and core2) are initialized, and the macroblocks count n is set to zero. The initialization may also involve defining the parameters of the stairstep pattern processing (see FIG. 5).

In step 704, the core0 performs header processing of the video data.

In step 706, the core0 performs variable length decoding (VLD) and sorting of the macroblocks.

In step 708, the core0 dispatches the regions of interest (ROIs) to the core1 and core2. Each ROI corresponds to a stairstep pattern of data blocks (see FIG. 3A or FIG. 5).

In step 710, the core0 verifies that a particular ROI is ready for processing by its assigned core (core1 or core2). According to an embodiment, such verification may be performed using triggering blocks (see FIG. 6). For example, if the core1 is processing the group 302a (see FIG. 3A) and has processed the block to the left of 304, then the core1 may notify the core0 that the block 304 in the group 302b is ready for processing by the core2.

If the ROI is ready, the core0 notifies the assigned core to begin processing. The processing then branches as shown in FIG. 7.

In step 712a, the core1 receives the notification from the core0 (see step 710) and performs initialization.

In step 714a, the core1 performs decoding on the assigned ROIs.

In step 716a, the core1 notifies the core0 that the core1 has finished processing.

The steps 712b, 714b and 716b correspond to the steps 712a, 714a and 716a, but apply to the processing of the core2 instead of the core1.

In step 718, the core0 receives notification from core1 or core2 that the core has finished processing (see step 716a or 716b).

In step 720, the core0 determines whether the notification was from the core1 (see step 716a) and the core1 is ready to be used. If so, the core0 proceeds to step 722. If not, the core0 proceeds to step 726.

In step 722, the core0 determines whether there are any remaining data blocks to be processed. If so, the core0 proceeds to step 724. If not, the core0 exits the process 700.

In step 724, the core0 increments the macroblocks count n by 1 (n++), dispatches the next ROI to the core1 (as indicated by the new n), and updates the core1 data ready flag.

In step 726, the core0 determines whether the notification was from the core2 (see step 716b) and the core2 is ready to be used. If so, the core0 proceeds to step 728. If not, the core0 proceeds to step 710.

In step 728, the core0 determines whether there are any remaining data blocks to be processed. If so, the core0 proceeds to step 730. If not, the core0 exits the process 700.

In step 730, the core0 increments the macroblocks count n by 1 (n++), dispatches the next ROI to the core2 (as indicated by the new n), and updates the core2 data ready flag. The core0 then proceeds to step 710.

FIGS. 8A-8B illustrate example pseudocode segments for processing one stairstep structure (e.g., one tile in a stairstep pattern) according to an embodiment of the present invention. In FIG. 8A, the VLD module implementation is aware of the stairstep pattern and it has sorted the macroblocks into the stairstep pattern already. In FIG. 8B, the VLD module implementation is not aware of the stairstep pattern (for example, the VLD module was implemented by a third party), and it has sorted the macroblocks into raster scan order.

Cache Locality Analysis

Motion compensation is a noteworthy module in a H.264/AVC decoder, which may occupy 20-50% of total performance. Motion compensation requires high memory throughput, with reference frame fetch as an important aspect of this feature. On a system with a small cache size, the proposed stairstep pattern tile decoding, with well chosen tile parameters, may reduce the reference frame data fetch; in other words, the reference data loaded into the cache are highly reused, hence the memory bandwidth requirement to the external memory bus is reduced.

TABLES 2A-2B shows data measured for several D1 resolution video streams for comparison between a 4×4 (SL=4, SH=4) stairstep pattern decoding and raster order decoding. TABLE 2A shows data using a 12 KByte dedicated cache for reference macroblocks, and TABLE 2B shows data using a 24 KByte dedicated cache for reference macroblocks. In TABLES 2A-2B, "miss rate" is defined as the ratio of reference macroblocks fetched from the external frame buffer with total accessed reference macroblocks, assuming all fetches and matches are in the units of macroblocks. The data shows a miss rate drop, hence the data bandwidth drop ranging from 11% to above 30%, by implementing an embodiment of the present invention. Due to different natures of motions in different streams, the benefit varies. It is noted that the best size of stairstep tile is dependent on the cache size of a given system.

TABLE 2A

| Streams (D1 resolution) | miss rate @ raster pattern | miss rate @ 4 × 4 stair pattern | reduction percentage of miss rate | reduction of memory bandwidth (MB/s) |
| --- | --- | --- | --- | --- |
| Stream 1 (1.6 Mbps) | 0.57 | 0.38 | 33.33% | 6.72 |
| Stream 2 (9.3 Mbps) | 0.50 | 0.33 | 34.00% | 6.01 |

TABLE 2B

| Streams (D1 resolution) | miss rate @ raster pattern | miss rate @ 4 × 4 stair pattern | reduction percentage of miss rate | reduction of memory bandwidth (MB/s) |
| --- | --- | --- | --- | --- |
| Stream 1 (1.6 Mbps) | 0.53 | 0.38 | 28.30% | 5.30 |
| Stream 2 (9.3 Mbps) | 0.45 | 0.33 | 26.67% | 4.24 |

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, one or more steps of methods or processes discussed above may be performed in a different order and still achieve desirable results. Based on the above disclosure and the following claims, other arrangements, embodiments, implementations and equivalents may be employed without departing from the scope of the invention as defined by the claims.

What is claimed is:

1. A multi-core processor system for processing video data, the multi-core processor system comprising:
    a memory system configured to store a plurality of data blocks;
    a plurality of processing cores, wherein the plurality of processing cores includes a control core and a plurality of other cores, and wherein the plurality of processing cores are configured to execute parallel processing of the plurality of data blocks; and
    an interconnect fabric that connects the plurality of processing cores and the memory system,
    wherein the plurality of processing cores is configured to execute parallel processing of the plurality of data blocks by
        the control core controlling a first core of the plurality of other cores to process a first set of the plurality of data blocks according to a stairstep pattern, the stairstep pattern including a plurality of rows of data blocks,
        the control core detecting, while the first core is processing the first set, that a triggering data block has been processed in the first set, and
        the control core controlling, while the first core is processing the first set, a second core of the plurality of other cores to process a second set of the plurality of data blocks according to the stairstep pattern and using information from the triggering data block, the triggering data block being a data block of the first set from which processing of one or more data blocks of the second set depends;
    wherein in one of the first set and the second set, the respective right-most data blocks of the rows follow a stairstep path in which each successive right-most block is horizontally offset from the immediately preceding right-most block by an offset in a common direction;
    wherein in the other one of the first set and the second set, the respective left-most data blocks of the rows follow the same stairstep path; and
    wherein the second set is located alongside the first set, with each of the right-most blocks located alongside a corresponding one of the left-most blocks.

2. The multi-core processor system of claim 1, wherein the triggering data block comprises a first triggering data block, and wherein the plurality of processing cores executes is further configured to execute parallel processing of the plurality of data blocks by:
    the control core detecting, while the second core is processing the second set, that a second triggering data block has been processed in the second set; and
    the control core controlling, while the second core is processing the second set, a third core of the plurality of other cores to process a third set of the plurality of data blocks according to the stairstep pattern and using information from the second triggering data block.

3. The multi-core processor system of claim 1, wherein the triggering data block comprises a first triggering data block, and wherein the plurality of processing cores is further configured to execute parallel processing of the plurality of data blocks by:
    the control core detecting, while the second core is processing the second set, that a second triggering data block has been processed in the second set; and
    the control core controlling, while the second core is processing the second set and after the first core has processed the first set, the first core to process a third set of the plurality of data blocks using information from the second triggering data block.

4. The multi-core processor system of claim 1, wherein the stairstep pattern has a stair height of four data blocks, a stair length of four data blocks, and a stair offset of one data block.

5. The multi-core processor system of claim 1, wherein the plurality of processing cores is configured to execute parallel processing of the plurality of data block by:
    the control core adjusting at least one of a stair height, a stair length, and a stair offset of the stairstep pattern according to an attribute of a video processing environment that includes the multi-core processor system.

6. The system of claim 1, wherein, in each of the first set and the second set, the number of data blocks in each row is the same for all rows of the set, such that in each of the first set and the second set, both the left-most data blocks of the rows and the right-most blocks of the rows follow the same stairstep path.

7. The multi-core processor system of claim 1, wherein the number of data blocks in each row of the first set is the same as the number of data blocks in each row of the second set.

8. The multi-core processor system of claim 1, wherein the offset is uniform in both magnitude and direction for the rows in both the first set and the second set.

9. The multi-core processor system of claim 1, wherein the number of rows in the first set is the same as the number of rows in the second set.

10. The multi-core processor system of claim 1, wherein the controlling includes postponing processing of the second set until after the triggering data block has been processed by the first core.

11. A method of processing video data, the method comprising:
   receiving a plurality of data blocks;
   processing a first set of the plurality of data blocks according to a stairstep pattern, wherein the stairstep pattern includes a plurality of rows of data blocks, and wherein each of the rows is horizontally offset from other ones of the plurality of rows;
   while processing the first set, detecting that a triggering data block has been processed in the first set; and
   while processing the first set, processing a second set of the plurality of data blocks according to the stairstep pattern and using information from the triggering data block, the triggering data block being a data block of the first set from which processing of one or more data blocks of the second set depends;
   wherein in one of the first set and the second set, the respective right-most data blocks of the rows follow a stairstep path in which each successive right-most block is horizontally offset from the immediately preceding right-most block by an offset in a common direction;
   wherein in the other one of the first set and the second set, the respective left-most data blocks of the rows follow the same stairstep path; and
   wherein the second set is located alongside the first set, with each of the right-most blocks located alongside a corresponding one of the left-most blocks.

12. The method of claim 11, wherein the triggering data block comprises a first triggering data block, further comprising:
   while processing the second set, detecting that a second triggering data block has been processed in the second set; and
   while processing the second set, processing a third set of the plurality of data blocks using information from the second triggering data block.

13. The method of claim 11, wherein processing the first set comprises:
   processing the first set according to the first stairstep pattern in a left-to-right, top-to-bottom manner.

14. The method of claim 11, further comprising:
   adjusting at least one of a stair height, a stair length, and a stair offset of the stairstep pattern according to an attribute of a video processing environment that implements the method of processing the video data.

15. The method of claim 11, wherein, in each of the first set and the second set, the number of data blocks in each row is the same for all rows of the set, such that in each of the first set and the second set, both the left-most data blocks of the rows and the right-most blocks of the rows follow the same stairstep path.

16. The method of claim 11, wherein the number of data blocks in each row of the first set is the same as the number of data blocks in each row of the second set.

17. The method of claim 11, wherein the offset is uniform in both magnitude and direction for the rows in both the first set and the second set.

18. The method of claim 11, wherein the number of rows in the first set is the same as the number of rows in the second set.

19. The method of claim 10, further comprising:
   postponing processing of the second set until after the triggering data block has been processed.

20. A multi-core processor that processes video data, the multi-core processor comprising:
   a control core; and
   a plurality of other cores,
   wherein the multi-core processor executes parallel processing comprising:
      the control core controlling a first core of the plurality of other cores to process a first set of a plurality of data blocks according to a stairstep pattern, the stairstep pattern including a plurality of rows of data blocks, wherein each of the rows is horizontally offset from other ones of the plurality of rows,
      the control core detecting, while the first core is processing the first set, that a triggering data block has been processed in the first set, and
      the control core controlling, while the first core is processing the first set, a second core of the plurality of other cores to process a second set of the plurality of data blocks according to the stairstep pattern and using information from the triggering data block, the triggering data block being a data block of the first set from which processing of one or more data blocks of the second set depends;
   wherein in one of the first set and the second set, the respective right-most data blocks of the rows follow a stairstep path in which each successive right-most block is horizontally offset from the immediately preceding right-most block by an offset in a common direction;
   wherein in the other one of the first set and the second set, the respective left-most data blocks of the rows follow the same stairstep path; and
   wherein the second set is located alongside the first set, with each of the right-most blocks located alongside a corresponding one of the left-most blocks.

* * * * *